US008650433B2

(12) United States Patent
Chokshi et al.

(10) Patent No.: US 8,650,433 B2
(45) Date of Patent: Feb. 11, 2014

(54) SHARED ETHERNET ADAPTER (SEA) LOAD SHARING AND SEA FAIL-OVER CONFIGURATION AS SET BY A USER INTERFACE

(75) Inventors: Shaival J. Chokshi, Round Rock, TX (US); Xiaohan Qin, Austin, TX (US); Rakesh Sharma, Austin, TX (US); Patrick T. Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 13/209,557

(22) Filed: Aug. 15, 2011

(65) Prior Publication Data
US 2013/0047024 A1     Feb. 21, 2013

(51) Int. Cl.
*G06F 11/00*     (2006.01)
*G06F 11/08*     (2006.01)

(52) U.S. Cl.
USPC ............... 714/5.11; 714/4.11; 714/5.1; 718/1

(58) Field of Classification Search
USPC .............. 714/5.11, 5.1, 4.11; 718/1, 102, 105
See application file for complete search history.

(56) References Cited

U.S. PATENT DOCUMENTS

| 5,790,775 | A  | * | 8/1998 | Marks et al. ................. 714/5.11 |
| 7,082,530 | B1 |   | 7/2006 | Diamant |
| 7,178,052 | B2 |   | 2/2007 | Hebbar et al. |
| 7,505,401 | B2 | * | 3/2009 | Kashyap ....................... 370/217 |
| 8,386,610 | B2 | * | 2/2013 | Yahalom et al. .............. 709/226 |
| 8,503,468 | B2 | * | 8/2013 | Akyol et al. .................. 370/419 |
| 2006/0250945 | A1 | * | 11/2006 | Fernandes et al. ............ 370/216 |
| 2009/0304022 | A1 | * | 12/2009 | Yang et al. .................... 370/463 |
| 2010/0257349 | A1 |   | 10/2010 | Lee |
| 2011/0283278 | A1 | * | 11/2011 | Murrell et al. .................... 718/1 |
| 2012/0254863 | A1 | * | 10/2012 | Baratakke et al. ................ 718/1 |

* cited by examiner

*Primary Examiner* — Joseph Schell
(74) *Attorney, Agent, or Firm* — Matthew B. Talpis; Gregory K. Goshorn; Greg Goshorn, P.C.

(57) ABSTRACT

Provided are techniques for configuring a primary shared Ethernet adapter (SEA) and a backup SEA into a failover (F/O) protocol; providing a user interface (UI) for enabling a user to request a SEA load sharing protocol; in response to a user request for a SEA load sharing protocol, verifying that criteria for load sharing are satisfied; setting, by the UI a load sharing mode, comprising: requesting, by the backup SEA to the primary SEA, implementation of the SEA load sharing protocol; responsive to the requesting by the backup SEA, the primary SEA transmit an acknowledgment to the backup SEA and transitions into a sharing state; and responsive to the acknowledgment from the primary SEA, the backup SEA transitions to the sharing state.

25 Claims, 8 Drawing Sheets

SHARED ETHERNET ADAPTER (SEA) LOAD SHARING AND SEA FAIL-OVER CONFIGURATION AS SET BY A USER INTERFACE

FIELD OF DISCLOSURE

The claimed subject matter relates generally to computer networking and, more specifically, to techniques for the conversion of a fail-over shared Ethernet adapter (SEA) into a load sharing configuration.

SUMMARY

Provided are techniques for the conversion of a tail-over shared Ethernet adapter (SEA) into a load sharing configuration. In a current Virtual I/O server (VIOS) environment, network redundancy is achieved by means of a SEA fail-over configuration. A SEA fail-over configuration consists of a primary SEA and a backup SEA, each residing in a separate VIOS. The SEA's communicate via a control channel through a power hypervisor (pHyp). Fail-over protocol is employed to determine which SEA is the primary SEA, i.e., actively bridging traffic for virtual I/O (VIO) clients. When the primary SAE is active, the backup SEA is dormant. If a fail-over occurs, the backup SEA then actively bridges traffic for VIO clients.

Provided are techniques for configuring a primary shared Ethernet adapter (SEA) and a backup SEA into a failover (F/O) protocol; providing a user interface (UI) for enabling a user to request a SEA load sharing protocol; in response to a user request for a SEA load sharing protocol, verifying that criteria for load sharing are satisfied; setting, by the UI a load sharing mode, comprising: requesting, by the backup SEA to the primary SEA, implementation of the SEA load sharing protocol; responsive to the requesting by the backup SEA, the primary SEA transmit an acknowledgment to the backup SEA and transitions into a sharing state; and responsive to the acknowledgment from the primary SEA, the backup SEA transitions to the sharing state.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
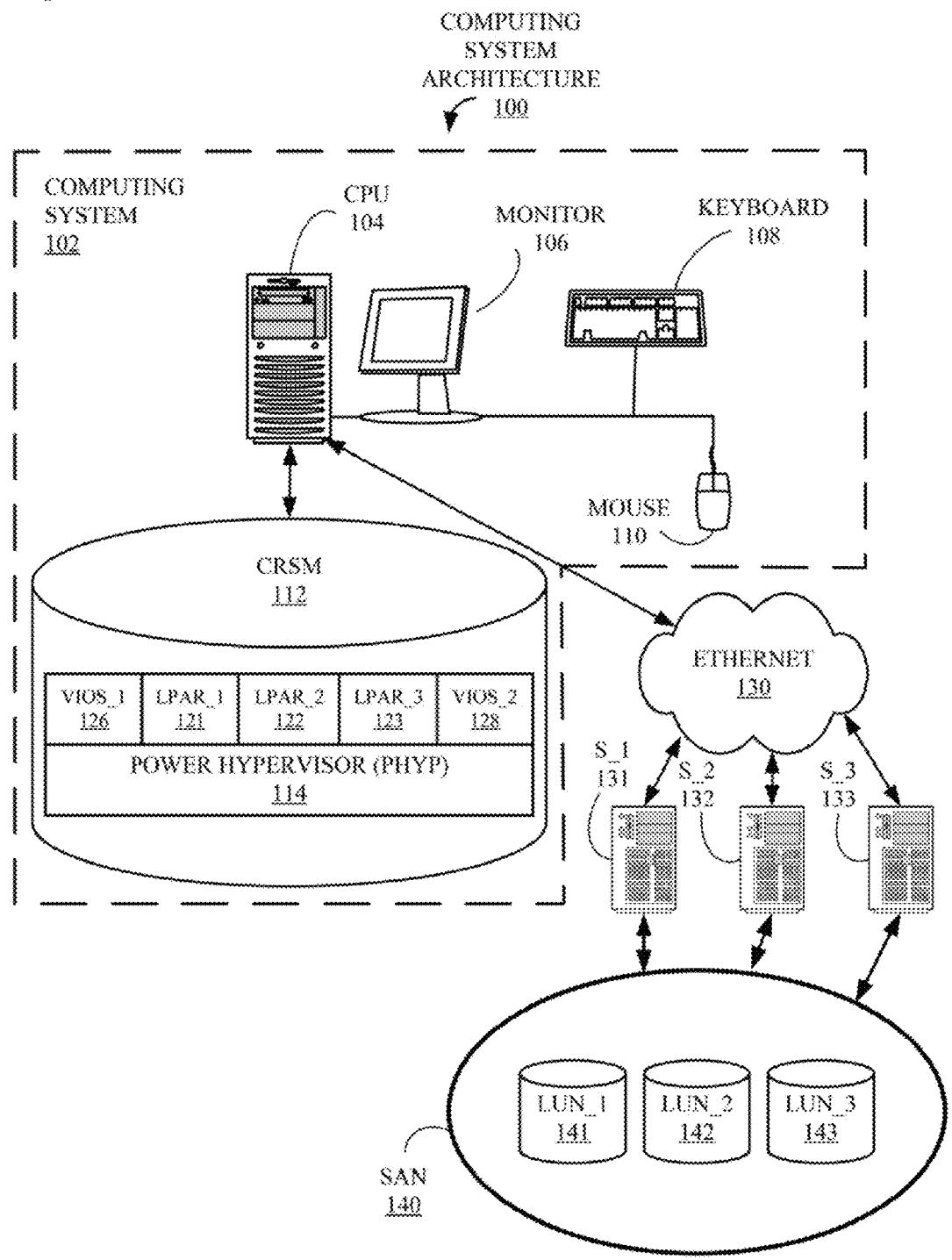
FIG. 1 is a block diagram of on computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, one limitation with current SEA failover technology, as described above, is that only one SEA is actively bridging traffic while the other SEA remains dormant waiting for a failover scenario. This particular configuration represents a significant waste of resources, perhaps as much as fifty percent (50%), which may be costly, particularly in a situation in which higher bandwidth adapters are employed in conjunction with a SEA.

Turning now to the figures, FIG. 1 is a block diagram of a computing system architecture 100 that may implement the claimed subject matter. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) component 112, which may either dynamic or non-dynamic memory and incorporated into computing system 102 i.e. an internal device, or attached externally to CPU 104 by means of various, commonly available connection devices such as but not limited to, a universal serial bus (USB) port (not shown).

CRSM 112 is illustrated storing a power hypervisor (PHYP) 114 and a number of logical partitions, or LPARs, i.e. a LPAR_1 121, a LPAR_2 122 and a LPAR_3 123. As should be familiar to one with skill in the relevant arts, each of LPAR 121-123 may implement a different operating system (OS) such that multiple OSs (not shown) are able to run concurrently on computing system 102. Also stored on CRSM 112 are two (2) virtual Input/Output servers, i.e. a VIOS_1 126 and a VIOS_2 128, which handle communication tasks associated with LPARs 121-123. The implementation and coordination of LPARs 121-12, the respective OSs and VIOSs 126 and 128 are handled by PHYP 114, as explained in more detail below in conjunction with FIGS. 2 and 3.

Computing system 102 is connected to an Ethernet 130, which is also connected to several server computers, i.e. a S_1 131, a S_2 132 and a S_3 133. Servers 131-133 may be any one of a number of different types of servers including, but not limited to, an email server, a database server and a storage server. Although in this example, computing system 102 and servers 131-133 are communicatively coupled via Ethernet 130, they could also be coupled through any number of communication mediums such as, but not limited to, the Internet, a local area network (LAN) and a wide area network (WAN). Servers 131-133 are connected to a storage area network (SAN) 140 that includes several storage devices, or logical units, specifically a LUN_1 141, a LUN_2 142 and a LUN_3 143. It should be noted there are many possible computing system configurations, of which computing system architecture 100 is only one simple example.

Figure 2:
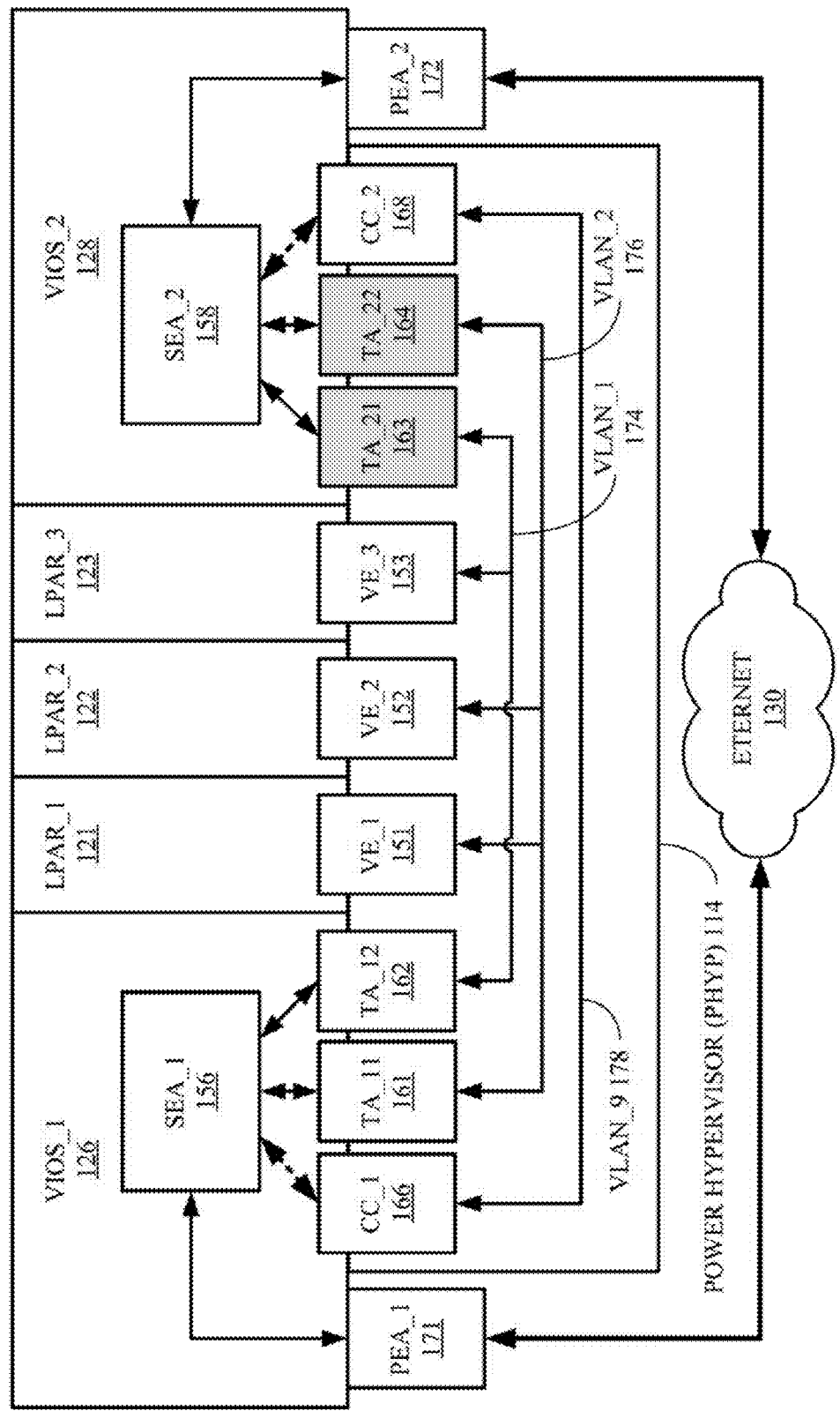
FIG. 2 is a block diagram of a SEA failover topology in a pre-load sharing configuration.

FIG. 2 is a block diagram of a SEA failover topology 150 in a pre-load sharing configuration. Topology 150 includes PHYP 114, LPARs 121-123, VIOSs 126 and 128 and Ethernet 130, all of which were first introduced above in conjunction with FIG. 1. LPARs 121-123 are communicatively coupled a virtual Ethernet, i.e. a VE_1 151, a VE_2 152 and a VE_3 153, respectively. VIOS_1 126 and VIOS_2 128 each include a SEA, i.e. a SEA 156, and a SEA 158, respectively. SEA 156 is communicatively coupled to, in this example, two (2) trunk adapters, i.e., a TA_11 161 and a TA_12 162. SEA adapter 158 is also communicatively coupled to two (2) trunk adapters, i.e. a TA_21 163 and a TA_22 164. In addition, SEAs 156 and 158 are each coupled to a control channel, i.e. a CC_1 166 and a CC_2 168, respectively, which provide communication between SEAs 156 and 158 via PHYP 114. It should be noted that although only two (2) SEAs, four (4) TAs and two (2) CCS are illustrated the disclosed technology is equally applicable to systems with a greater number of such components.

Each of VIOS 126 and 128 is coupled to a physical Ethernet adapter, i.e. PEA_1 171 and PEA_2 172, respectively, which provide a connection between a virtual Ethernet environment (consisting of trunk adapters, PHYP virtual switch, and client virtual Ethernet adapters) and physical Ethernet 130. FIG. 2 also illustrates several virtual LANs, specifically a VLAN_1 174, which is coupled to TA_12 162, VE_3 153 and TA_21 163, a VLAN_2 176, which is coupled to TA_11 161, VE_1 151, VE_2 152 and TA_22 164. VLANs 174 and 176 provide communication among the various coupled components, enabling each of LPARs 121-123 to communicate with both VIOS_1 126 and VIOS_2 128. In addition, there is a virtual LAN, i.e. VLAN_9 178, which provides communication means between CC_1 166 and CC_2 168 via PHYP 114.

In this example, TA_21 163 and TA_22 164 are shaded to indicate that they are currently inactive. Thus, VIOS_2 128 is inactive, or in other words, in a backup mode. TA_11 161 and TA_12 162, which are not shaded to indicate they are active. In other words, VIOS_1 126 is active and in a primary mode. The functions of the various components illustrated in FIG. 2 are explained in more detail in conjunction with FIGS. 4-6.

Figure 3:
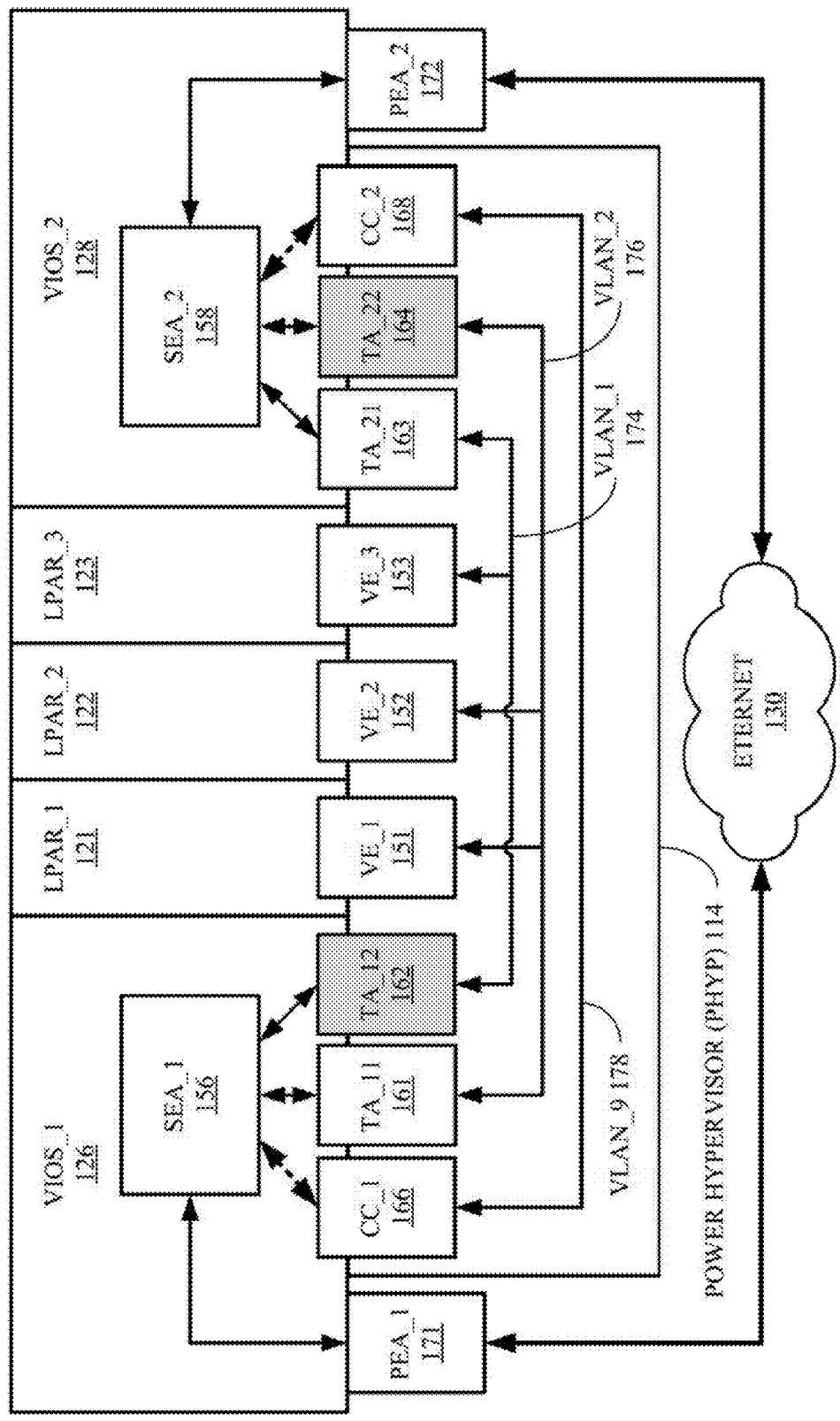
FIG. 3 is a block diagram of a SEA failover topology in a post-load sharing configuration.

FIG. 3 is a block diagram of a SEA failover topology 180 in a post-load sharing configuration. Topology 180 includes PHYP 114, LPARs 121-123, VIOSs 126 and 128 and Ethernet 130, all of which were introduced above in conjunction with FIGS. 1 and 2. Also include in FIG. 3 are VEs 151-153, SEAs 156 and 158, TAs 161-164. CCs 166 and 168, PEAs 171 and 172 and VLANs 174, 176 and 178, which were all first introduced above in conjunction with FIG. 2. In this example, TA_12 162 and TA_22 164 are shaded to indicate that they are currently inactive. TA_11 161 and TA_21 162 are not shaded to indicate they are active. In other words, both VIOS_1 126 and VIOS_2 128 are active and sharing the duties formerly handled by one of VIOS_1 126 or VIOS_2 128 at any particular time. The functions of the various components illustrated in FIG. 3 are explained in more detail in conjunction with FIGS. 4-6.

Figure 4:
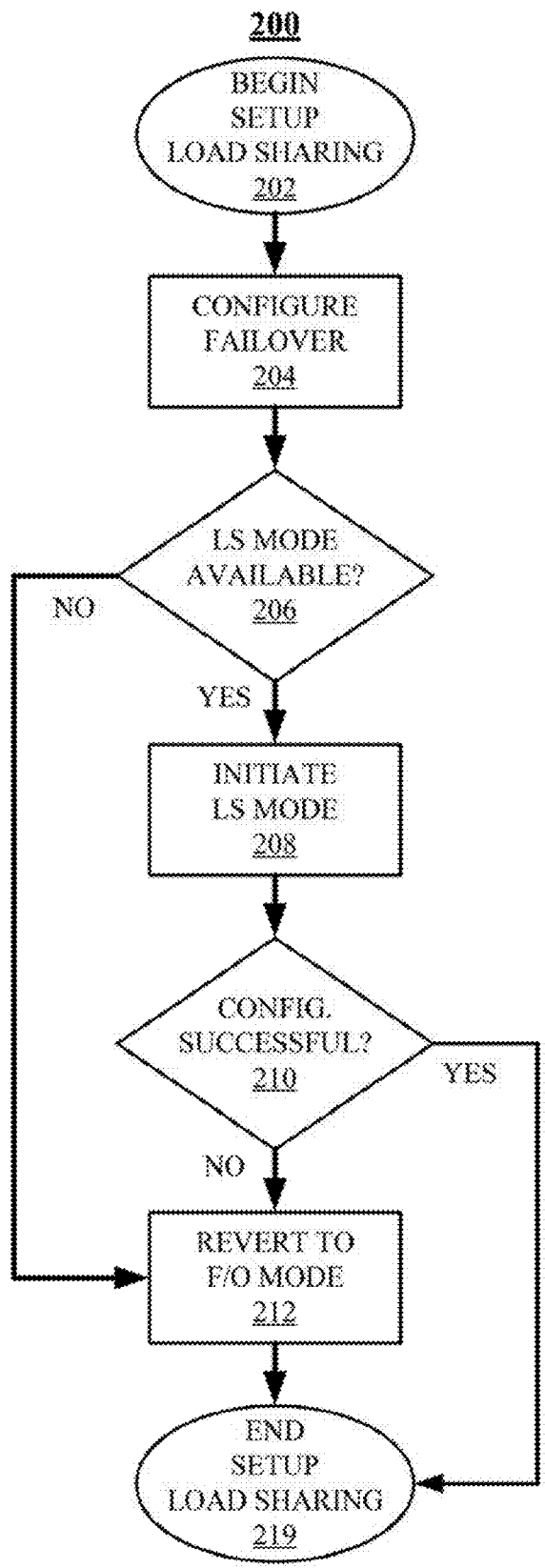
FIG. 4 is a flowchart of one example of a Setup Load Sharing process in accordance with the claimed subject matter.

FIG. 4 is a flowchart of one example of a Setup Load Sharing process 200 in accordance with the claimed subject matter. Process 200 is initiated by VIOS_2 128 (FIGS. 1-3) or, in other words, the VIOS that would typically be functioning as a backup to the primary VIOS. In this example, logic associated with process 200 is stored in CRSM 112 (FIG. 1) and executed on one or more processors (not shown) associated with CPU 104 (FIG. 1) and computing system 102 (FIG. s).

Process 200 starts in a "Begin Setup Load Sharing" block 202 and proceeds immediately to a "Configure Failover" block 204. During processing associated with bock 204, VIOS_2 128 is configured in a standard failover mode, which should be familiar to one with skill in the relevant arts. During processing associated with a "Load Sharing (LS) Mode Available?" block 206, a determination is made as to whether or not VIOS_2 128 (FIGS. 1-3) is configured to handle the load sharing of the claimed subject matter. If not, control proceeds to a "Revert to F/O mode" block 212 during processing associated with both VIOS_1 126 and VIOS_2 128 are configured and operate in a standard failover mode.

If, during processing associated with bock 206, a determination is made that LS mode is available, control proceeds to an "Initiate LS Mode" block 208, which is explained in more detail below in conjunction with FIGS. 5 and 6. The determination may be based on such criteria as whether or not the SEA configuration meets load sharing requirements and whether or not at least two trunk adapters are appropriately configured. During processing associated with a "Configuration (Config.) Successful?" block 210, a determination is made as to whether or not the conversion to LS mode initiated during processing associated with block 208 was successful. If not, control proceeds to block 212 and processing continues as explained above. Finally, if during processing associated with block 210 a determination is made that the configuration to LS mode was successful or following block 212, control proceeds to an "End Setup Load Sharing" block 219 during which process 200 is complete.

Figure 5:
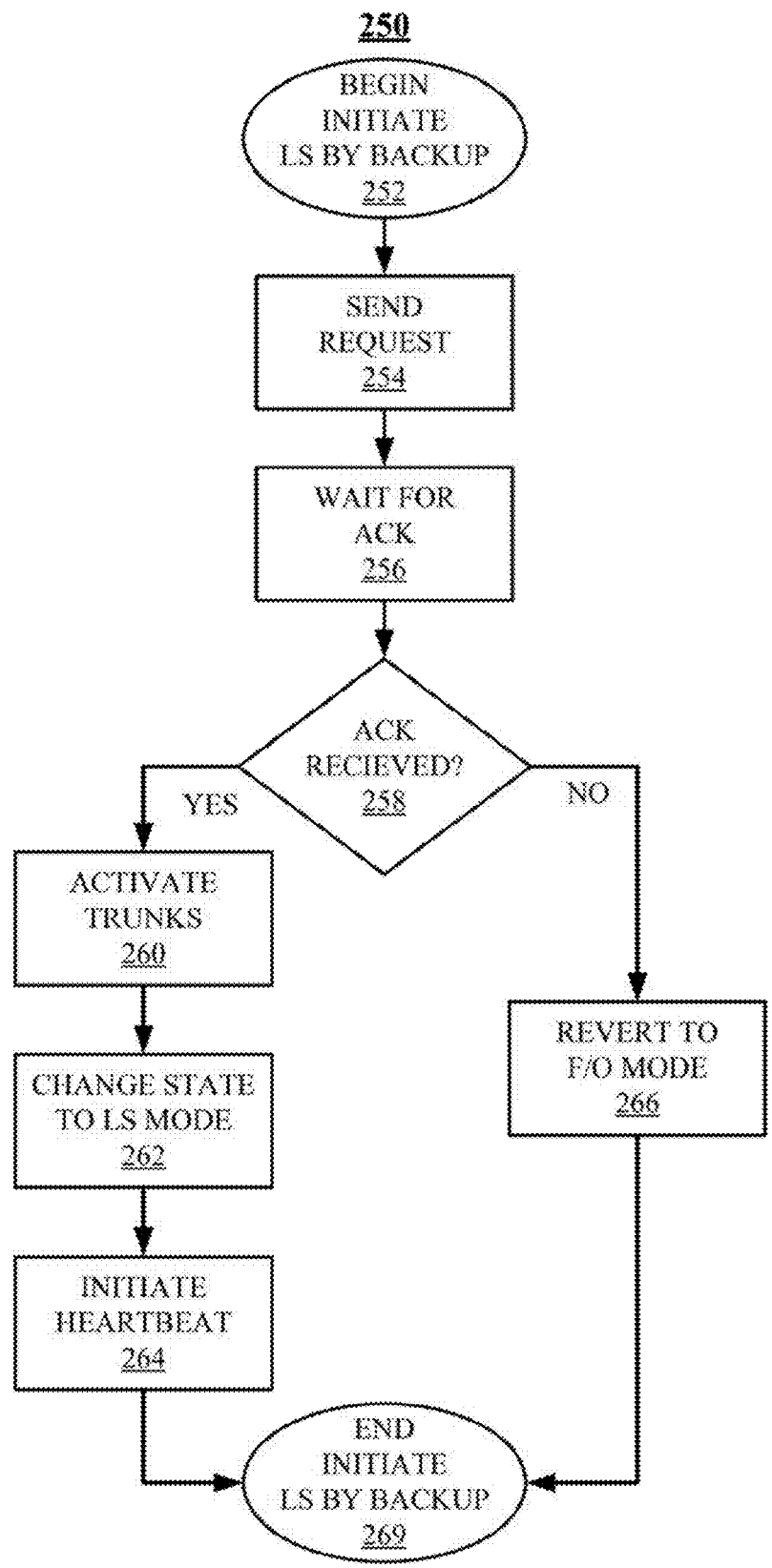
FIG. 5 is a flowchart of one example of an Initiate Load Sharing process from the perspective of a backup SEA in accordance with the claimed subject matter.

FIG. 5 is a flowchart of one example of an Initiate Load Sharing process 250 from the perspective of backup SEA 158 (FIGS. 2 and 3) in accordance with the claimed subject matter. Like process 200, Process 250 is initiated (see 208, FIG. 4) by VIOS_2 128 (FIGS. 1-3) or, in other words, the VIOS that would typically be functioning as a backup to the primary VIOS. In this example, logic associated with process 250 is stored in CRSM 112 (FIG. 1) and executed on one or more processors (not shown) associated with CPU 104 (FIG. 1) and computing system 102 (FIG. 1).

Process starts in a "Begin Initiate Load Sharing (LS) by Backup" block 252 and proceeds immediately to a "Send Request" block 254. During processing associated with block 254, a request to initiate LS mode is transmitted from, in this example, CC_2 168 in VIOS_2 128 to CC_1 166 in VIOS_1 126 (FIGS. 1-3). During processing associated with a "Wait for Acknowledgment (Ack)" block 256, VIOS_1 126 waits for a signal from VIOS_1 concerning the request transmitted during processing associated with block 254.

During processing associated with an "Ack Received?" block 258, a determination is made as to whether or not VIOS_1 126 has acknowledged a conversion into LS mode. It should be noted that a determination that VIOS_l 126 is converting into LS mode is typically an explicit acknowledgement transmitted from VIOS_1 126 to VIOS_2 128. A determination that, for whatever reason, VIOS_1 126 is not converting may either be an explicit rejection transmitted from VIOS_1 126 to VIOS_2 128 or merely based upon the expiration or a timer (not shown).

If a determination is made that an acknowledgment has been transmitted from VIOS_1 126, control proceeds to an "Activate Trunks" block 260. During processing with block 260, VIOS_2 128 activates the trunk adapter (see TA_21 163, FIG. 3) that VIOS_2 128 will be responsible for serving in the newly configured LS, mode. During a "Change State to LS Mode" block 262 the state of VIOS 2 128 is modified to account for the conversion to LS mode. During an "Initiate Heartbeats" block 264, a load sharing heartbeat is established between VIOS_1 126 and VIOS_2 128. Failure of the heartbeat initiates a F/O scenario (not shown) in which either VIOS_1 126 or VIOS_2 128 resumes servicing communication between LPARs 121-123 (FIGS. 1-3) and Ethernet 130.

If, during processing associated with block 258, the request initiated during processing associated with block 258 is not acknowledged, either because of an explicit rejection from VIOS_2 126 or the expiration of a timer, control proceeds to a "Revert to F/O Mode" block 266. During processing associated with block 266, both VIOS_1 126 and VIOS_2 128 are configured and operate in a standard failover mode. Finally, following block 264 or 266, process 250 proceeds to an "End Initiate LS by Backup" block 269 during which process 250 is complete.

Figure 6:
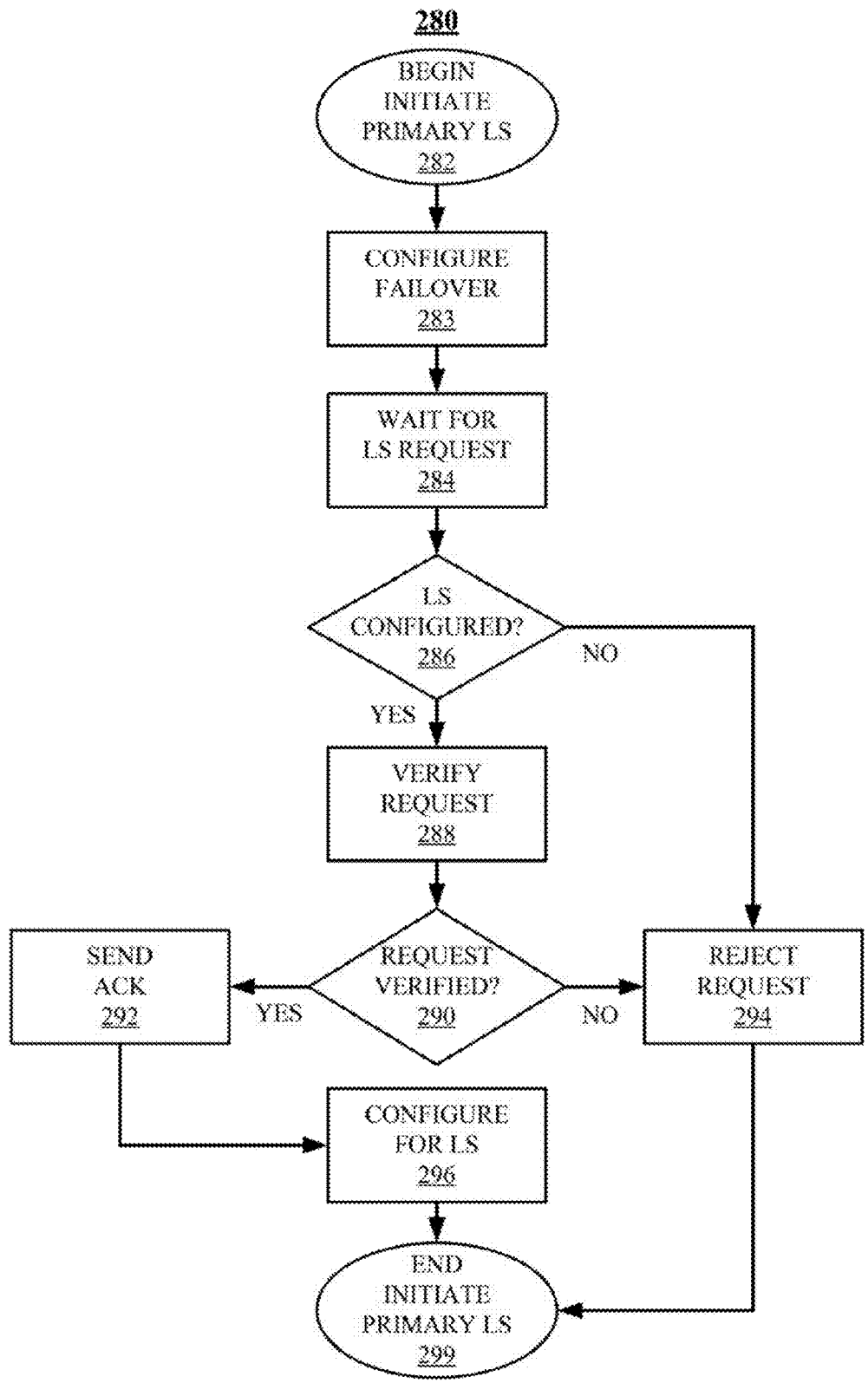
FIG. 6 is a flowchart of one example of an Initiate Load Sharing process from the perspective of a primary SEA in accordance with the claimed subject matter.

FIG. 6 is a flowchart of one example of an Initiate Load Sharing process 280 from the perspective of primary SEA 156 (FIGS. 2 and 3) in accordance with the claimed subject matter. Process 280 is initiated by VIOS_1 126 (FIGS. 1-3) or, in other words, the VIOS that would typically be functioning as the primary VIOS. In this example, logic associated with process 280 is stored in CRSM 112 (FIG. 1) and executed on one or more processors (not shown) associated with CPU 104 (FIG. 1) and computing system 102 (FIG. 1).

Process 280 starts in a "Begin Initiate Primary LS" block 282 and proceeds immediately to a "Configure Failover" block 283. During processing associated with bock 283, VIOS_1 126 is configured in a standard failover mode, which should be familiar to one with skill in the relevant arts. During a "Wait For LS Request" block 284, a request is received by VIOS_l 126 from VIOS_2 128 (FIGS. 1-3) to initiate a LS mode (see 254, FIG. 5). During processing associated with a "LS Configured?" block 286 a determination is made whether or not VIOS_1 126 is configured to handle load sharing in accordance with the disclosed technology. If so, control proceeds to a "Verify Request" block 288. During processing associated with block 288, VIOS_1 126 verifies that all necessary criteria for load sharing are met such as, but not limited to, that the request has originated from VIOS_2 128 and that all necessary components are able to be appropriately configured. During processing associated with a "Request Verified?" block 290, determination is made whether or not the verification performed during processing associated with block 288 was completed successfully. If so, control proceeds to a "Send Ack" block 292 during which VIOS_1 126 sends an acknowledgement to VIOS_2 128 (see 256, 258, FIG. 5). During processing associated with a "Configure for LS" block 296, VIOS_1 126 is reconfigured for load sharing. Such a configuration typically involves a deactivation of trunk adapters that are to be serviced by VIOS_2 128 (see TA_12 162 and 163, FIG. 3), a change in the state of VIOS_2 128 is implemented to account for the conversion to LS mode and the establishment of a heartbeat with VIOS_2 128 (sec 264, FIG. 5). Failure of the heartbeat initiates a F/O scenario (see FIG. 7) in which either VIOS_1 126 or VIOS_2 128 resumes servicing communication between LPARs 121-123 (FIGS. 1-3) and Ethernet 130.

If, during processing associated with block 286, a determination is made that VIOS_1 126 is not properly configured for load sharing, control proceeds to a "Reject Request" block 294 during processing associates with VIOS_1 126 transmits a rejection to VIOS_2 126 (see 258, 266, FIG. 5). Finally, after processing associated with blocks 294 and 296, control proceeds to an "End Initiate Primary LS" block 299 during which process 280 is complete.

Figure 7:
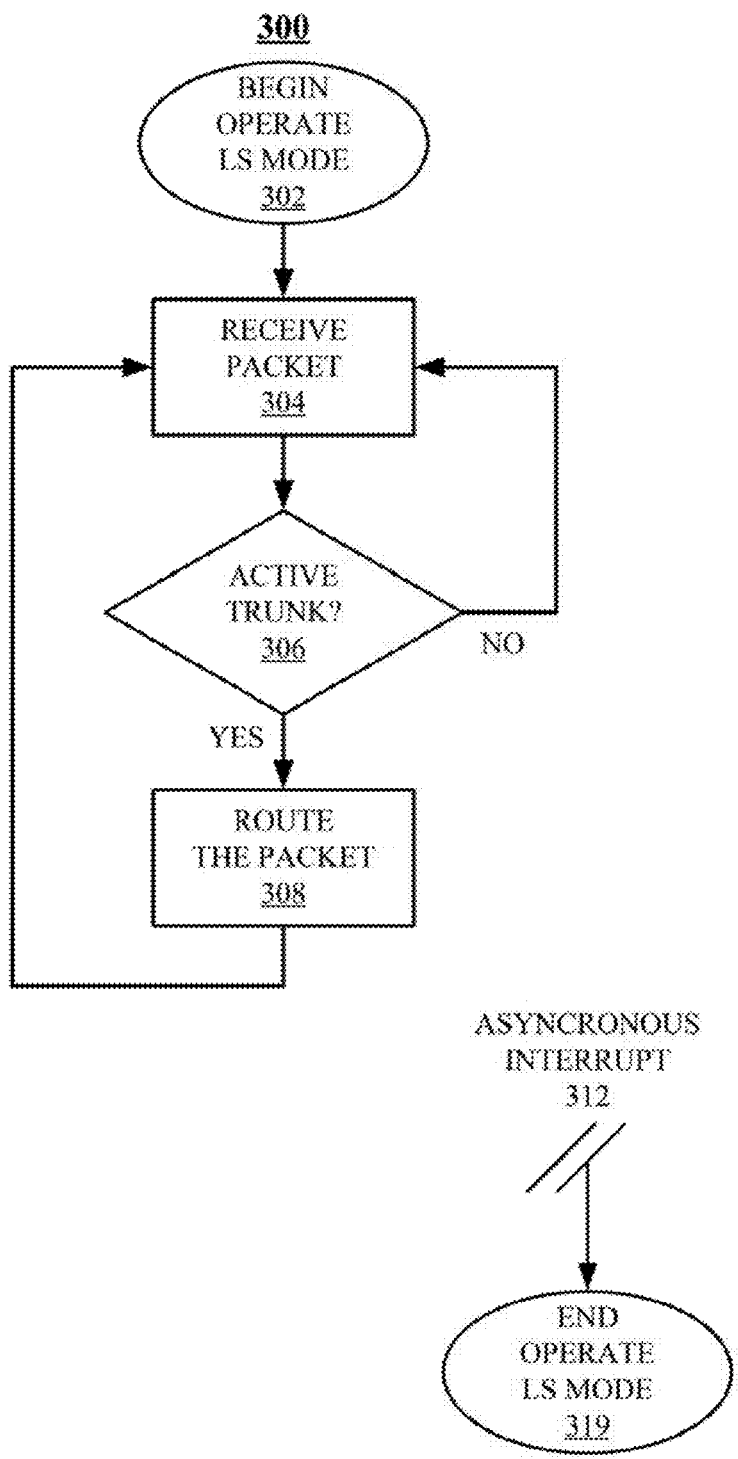
FIG. 7 is a flowchart of one example of an Operate Load Sharing (LS) Mode process in accordance with the claimed subject matter.

FIG. 7 is a flowchart of one example of an Operate Load Sharing (LS) Mode process 300 in accordance with the claimed subject matter. In a load sharing mode, process 300 is typically implemented on both the primary and backup SEAs 156 and 158 (FIGS. 2 and 3). Although both SEAs 156 and 158 execute process 300, this example will be described from the viewpoint of primary SEA 156.

Process 300 starts in a "Begin Operate LS Mode" block 302 and proceeds immediately to a "Receive Packet" block 304. During processing associated with block 304, a packet, i.e. a traffic routing request, is received by SEA 156, either from a physical adapter to a virtual trunk adapter or vice versa. During processing associated with an "Active Trunk?" block 306, a determination is made as to whether or not the routing request received during processing associated with block 304 corresponds to a trunk that is currently active for SEA 156 (see 161 and 162, FIG. 3). If the requested trunk is not active, SEA 156 drops the packet and control returns to block 304 to await another request and processing continues as described above. If the requested trunk is active, control proceeds to a "Route The Packet" block 308 during which the received packet is routed to the requested destination device, i.e. the physical adapter or virtual trunk adapter. Control then returns to block 304 to await another request and processing continues as described above.

Finally, process 300 is halted by means of an asynchronous interrupt 312, which passes control to an "End Operate LS Mode" block 319 in which process 300 is complete. Interrupt 312 may be generated when part of SEA 156 is detected as mal-functioning. In addition, interrupt 312 may be received when another SEA, for whatever reason has initiated a transition from load sharing to F/O mode (see 360, FIG. 8) and has thus stopped transmitting a load sharing heartbeat. During normal operation, process 300 continuously loops through the blocks 304, 306, and 308, processing routing requests as received.

Figure 8:
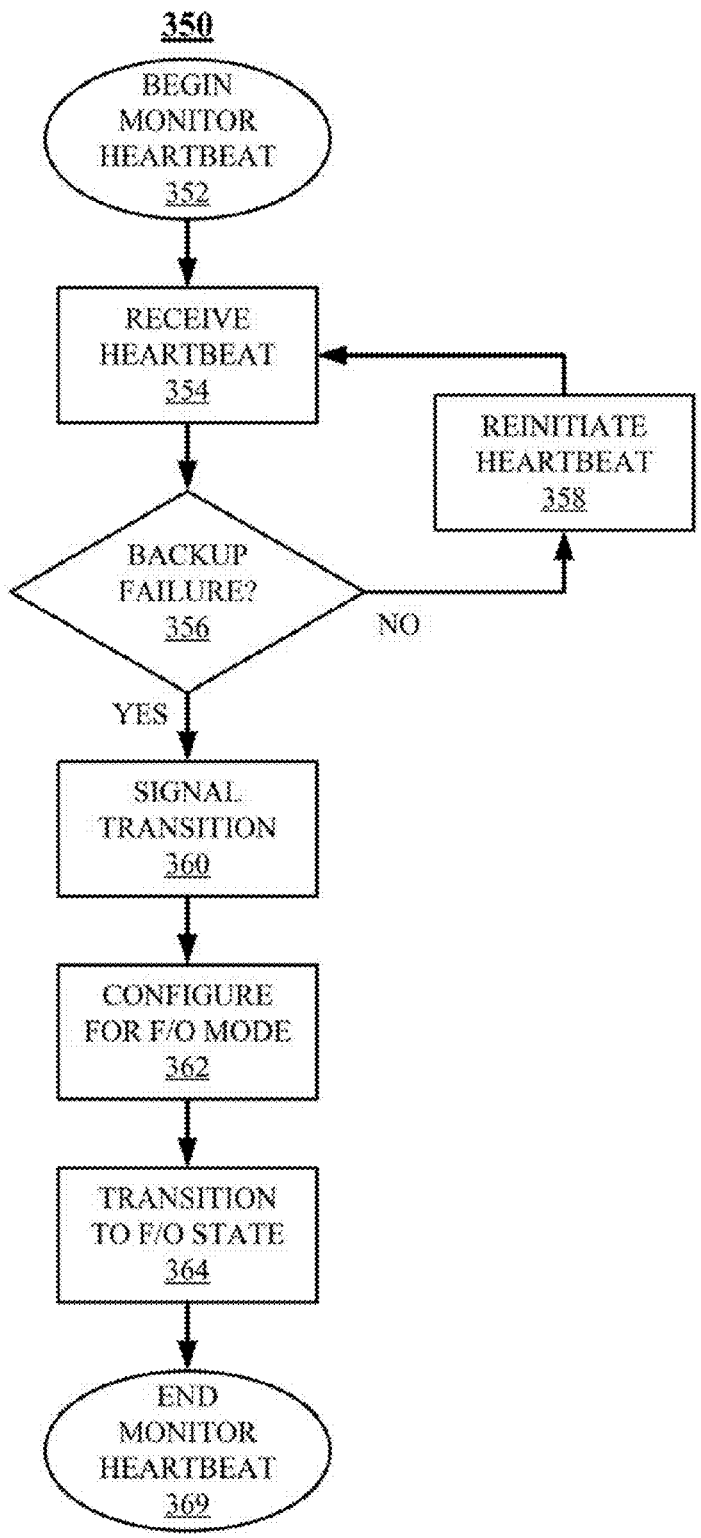
FIG. 8 is a flowchart of one example of a Monitor Heartbeat process in accordance with the claimed subject matter.

FIG. 8 is a flowchart of one example of a Monitor Heartbeat process 350 in accordance with the claimed subject matter. Process 350 may be implemented on one or both of the primary and backup SEAs 156 and 158 (FIGS. 2 and 3). Although either or both the SEAs 156 and 158 may execute process 350, this example will be described from the viewpoint of primary SEA 156.

Process 350 starts in a "Begin Monitor Heartbeat" bock 352 and proceeds immediately to a "Receive Heartbeat" block 354. During processing associated with block 354, primary SEA 156 periodically receives a heartbeat signal from backup SEA 158 (see 264, FIG. 5). Upon an interruption in the heartbeat, typically detected by the expiration of a timer (not shown) in primary SEA 156, control proceeds to a "Backup Failure?" block 356. During processing associated with block 356, a determination is made as to whether or not the expiration of the time represents a heartbeat failure, i.e. that backup SEA 158 is no longer active. For example primary SEA 156 may ping backup SEA 158. If determined that backup SEA 158 is still active, steps are taken to reinitiate the heartbeat during processing associated with a "Reinitiate Heartbeat" block 358. Control then returns to block 354 and processing continues as described above.

If, during processing associated with block 356, a determination is made that backup SEA 158 is no longer active, control proceeds to a "Signal Transition" block 360. During processing associated with block 360, an asynchronous signal is generated to signal any other SEAs that the system is transitioning to a F/O configuration (see 312, FIG. 7). During processing associated with a "Configure for F/O Mode" block 362, primary SEA 156 reconfigures for the standard F/O mode. During processing associated with a "Transition to F/O State" block 364, primary SEA 156 begins operating in the standard F/O state. Finally, during processing associated with an "End Operate LS State" block 369, process 350 is complete. If at some point backup SEA 158 becomes active, a LS state may be reinitiated (see 200, FIG. 4; 250, FIGS. 5; and 280, FIG. 6).

In this manner, the disclosed technology seamlessly extends an existing F/O protocol with the SEA load sharing protocol and falls back to the F/O protocol in presence of any device or VIOS failure. In addition, the disclosed load sharing protocol maintains backward compatibility. For example, if one of the VIOSs has down-level SEA device driver code that doesn't support SEA load sharing, the two SEA simply operate in the F/O mode. In case the primary SEA has down-level code, it will not understand the request sent by the backup SEA and thus not acknowledge the load sharing request. As a result, the backup SEA will revert to the failover mode. In case the backup SEA has down-level software, it will not initiate load sharing request; the primary SEA will remain in the failover mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:
1. A method, comprising
configuring a primary shared Ethernet adapter (SEA) and a backup SEA into a failover (F/O) state;
providing a user interface (UI) for enabling a user to request a SEA load sharing protocol;
in response to a user request for a SEA load sharing protocol, verifying that criteria for the SEA load sharing protocol are satisfied; and
setting, by the Ul, a load sharing mode, comprising:
requesting, by the backup SEA to the primary SEA, implementation of the SEA load sharing protocol;
responsive to the requesting by the backup SEA, the primary SEA transmitting an acknowledgment to the backup SEA and transitioning into a load sharing state; and
responsive to the acknowledgment from the primary SEA, the backup SEA transitioning to the load sharing state.

2. The method of claim 1, further comprising transmitting, from the backup SEA to the primary SEA, information identifying a plurality of virtual local area networks (VLANs) serviced by the backup SEA in the load sharing state.

3. The method of claim 1, wherein communication between the primary SEA and the backup SEA is via a control channel used for fail-over communication.

4. The method of claim 3, wherein the control channel is via a hypervisor.

5. The method of claim 1, wherein an error during a transition to a load sharing state initiates a reversion of the primary SEA and the backup SEA to a fail-over state.

6. The method of claim 1, further comprising:
transmitting a heartbeat from the primary SAE to the backup SEA; and
upon detection of an interruption in the heartbeat, implementing a transition of the backup SEA from the load sharing state to the fail-over state.

7. The method of claim 1, further comprising:
transmitting a heartbeat from the backup SEA to the primary SEA; and
upon detection of an interruption of the heartbeat, implementing a transition of the primary SEA from the load sharing state to the fail over state.

8. The method of claim 1, wherein verifying that criteria for the SEA load sharing protocol are satisfied comprising verifying that the primary SEA and the backup SEA are properly configured to implement load sharing.

9. An apparatus, comprising
a processor;
a computer readable storage medium (CRSM) coupled to the processor;
a primary shared Ethernet adapter (SEA);
a backup SEA;
a user interface (UI) for enabling a user to request a SEA load sharing protocol; and
logic, stored on the CRSM and executed on the processor, for:
in response to a user request for a SEA load sharing protocol, verifying that criteria for the SEA load sharing protocol are satisfied; and
setting, by the UI, a load sharing mode, comprising logic for:
requesting, by the backup SEA to the primary SEA, implementation of the SEA load sharing protocol;
responsive to the requesting by the backup SEA, the primary SEA transmitting an acknowledgment to the backup SEA and transitioning into a load sharing state; and
responsive to the acknowledgment from the primary SEA, the backup SEA transitioning to the load sharing state.

10. The apparatus of claim 9, further the logic further comprising logic for transmitting, from the backup SEA to the primary SEA, information identifying a plurality of virtual local area networks (VLANs) serviced by the backup SEA in the load sharing state.

11. The apparatus of claim 9, further comprising a control channel wherein communication between the primary SEA and the backup SEA is via the control channel.

12. The apparatus of claim 11, wherein the control channel is via a hypervisor.

13. The apparatus of claim 9, wherein an error during a transition to a load sharing state initiates a reversion of the primary SEA and the backup SEA to a fail-over state.

14. The apparatus of claim 9, the logic further comprising logic for:
transmitting a heartbeat from the primary SAE to the backup SEA; and
upon detection of an interruption in the heartbeat, implementing a transition of the backup SEA from the load sharing state to a fail-over state.

15. The apparatus of claim 9, the logic further comprising logic for:
transmitting a heartbeat from the backup SEA to the primary SEA; and
upon detection of an interruption of the heartbeat, implementing a transition of the primary SEA from the load sharing state to a fail over state.

16. An computer programming product, comprising
a computer readable storage medium (CRSM); and
logic, stored on the CRSM for execution on a processor, for:
configuring a primary shared Ethernet adapter (SEA) and a backup SEA into a failover (F/O) state;
providing a user interface (UI) for enabling a user to request a SEA load sharing protocol;
in response to a user request for a SEA load sharing protocol, verifying that criteria for the SEA load sharing protocol are satisfied; and
setting, by the Ul, a load sharing mode, comprising:

requesting, by the backup SEA to the primary SEA, implementation of the SEA load sharing protocol;

responsive to the requesting by the backup SEA, the primary SEA transmitting an acknowledgment to the backup SEA and transitioning into a load sharing state; and responsive to the acknowledgment from the primary SEA, the backup SEA transitioning to the load sharing state.

17. The computer programming product of claim 16, the logic further comprising logic for transmitting, from the backup SEA to the primary SEA, information identifying a plurality of virtual local area networks (VLANs) serviced by the backup SEA in the load sharing state.

18. The computer programming product of claim 16, wherein communication between the primary SEA and the backup SEA is via a control channel used for fail-over communication.

19. The computer programming product of claim 18, wherein the control channel is via a hypervisor.

20. The computer programming product of claim 16, the logic further comprising logic for:

transmitting a heartbeat from the primary SAE to the backup SEA; and upon detection of an interruption in the heartbeat, implementing a transition of the backup SEA from the load sharing state to the fail-over state.

21. The computer programming product of claim 16, the logic further comprising logic for:

transmitting a heartbeat from the backup SEA to the primary SEA; and upon detection of an interruption of the heartbeat, implementing a transition of the primary SEA from the load sharing state to the fail over state.

22. The computer programming product of claim 16, the logic for verifying that criteria for the SEA load sharing protocol are satisfied comprising logic for verifying that the primary SEA and the backup SEA are properly configured to implement load sharing.

23. An apparatus, comprising a processor;

a computer readable storage medium (CRSM) coupled to the processor;

a backup SEA;

a user interface (UI) for enabling a user to request a SEA load sharing protocol; and logic, stored on the CRSM and executed on the processor, for:

in response to a user request for a SEA load sharing protocol, verifying that criteria for the SEA load sharing protocol are satisfied; and setting, by the UI, a load sharing mode, comprising logic for:

requesting, by the backup SEA to a primary SEA, implementation of the SEA load sharing protocol;

responsive to a acknowledgment from the primary SEA of a transition to a load sharing state, the backup SEA transitioning to the load sharing state.

24. The apparatus of claim 23, further the logic further comprising logic for transmitting from the backup SEA to the primary SEA, information identifying a plurality of virtual local area networks (VLANs) serviced by the backup SEA in the load sharing state.

25. The apparatus of claim 23, the logic further comprising logic for:

receiving a heartbeat from the primary SEA; and upon detection of an interruption of the heartbeat, implementing a transition from the load sharing state to a fail over state.

\* \* \* \* \*